Figure 1:
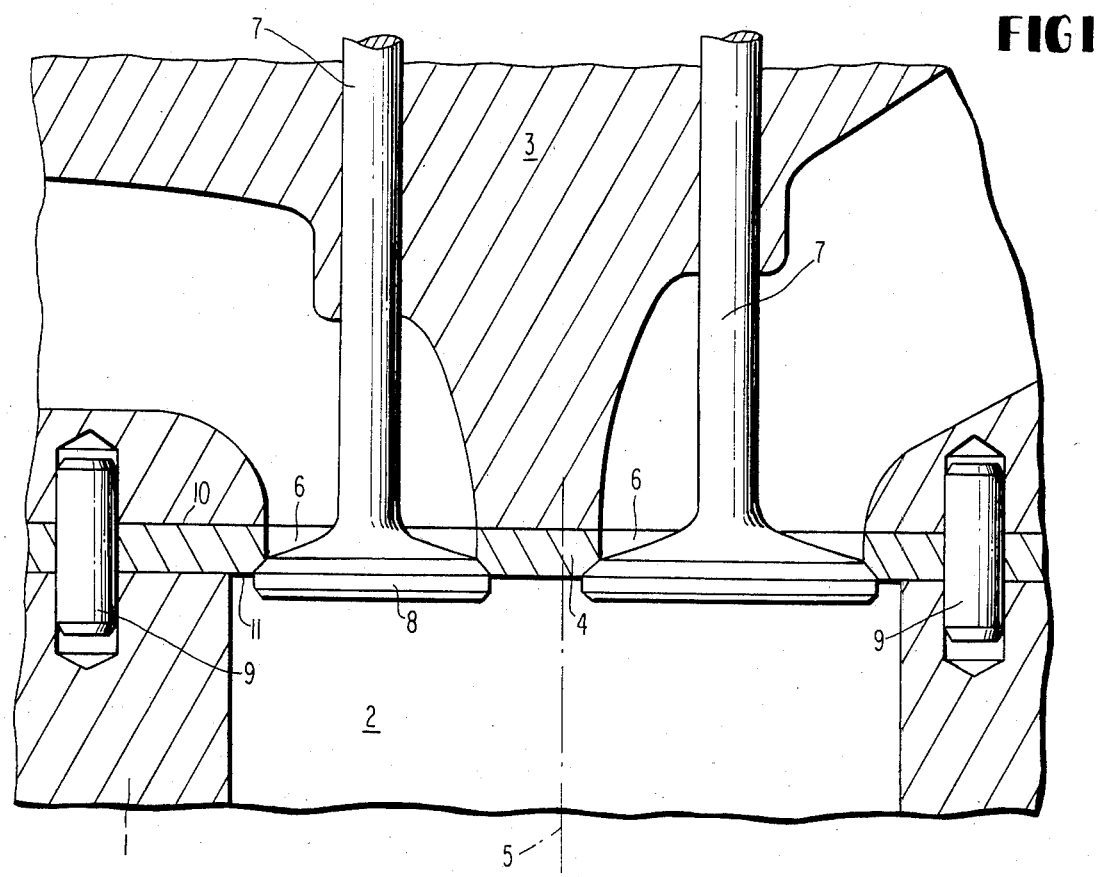

United States Patent [19]

Zeilinger et al.

[11] Patent Number: 4,561,634

[45] Date of Patent: Dec. 31, 1985

[54] SEAL OF A CYLINDER HEAD OF AN INTERNAL COMBUSTION ENGINE

[75] Inventors: Karl Zeilinger, Berglen; Reiner Bachschmid, Kernen, both of Fed. Rep. of Germany

[73] Assignee: Daimler-Benz Aktiengesellschaft, Fed. Rep. of Germany

[21] Appl. No.: 132,133

[22] Filed: Mar. 20, 1980

[30] Foreign Application Priority Data

Mar. 24, 1979 [DE] Fed. Rep. of Germany ....... 2911683

[51] Int. Cl.⁴ .............................................. F16K 41/00
[52] U.S. Cl. .................................... 251/364; 251/361; 277/235 A; 277/235 B
[58] Field of Search ........... 277/235 A, 235 R, 235 B; 123/41.72, 41.74; 251/361, 364

[56] References Cited

U.S. PATENT DOCUMENTS

| | | | |
|---|---|---|---|
| 1,828,471 | 10/1931 | Oren | 277/235 B |
| 2,711,334 | 6/1955 | Balfe | 277/235 B |
| 4,049,856 | 9/1977 | Adams | 277/235 B |

FOREIGN PATENT DOCUMENTS 169658 6/1956 Netherlands ...................... 251/361

Primary Examiner—A. Michael Chambers
Attorney, Agent, or Firm—Craig and Burns

[57] ABSTRACT

A sealing arrangement of the cylinder head with respect to the cylinder block by means of a flat seal which is constructed as intermediate plate and extends from the edge of the cylinder bore also up to its cylinder axis; essentially only circular openings for disk valves are provided in the intermediate plate so that the latter represents a thermal insulation of the combustion space with respect to the cylinder head.

14 Claims, 2 Drawing Figures

SEAL OF A CYLINDER HEAD OF AN INTERNAL COMBUSTION ENGINE

The present invention relates to a sealing arrangement of the cylinder head with respect to the cylinder block of a reciprocating piston internal combustion engine by means of a flat seal extending in the radial direction at least from a cylinder bore to the circumference of the cylinder collar or flange, which is provided with through-openings or passages for liquids and gases.

It serves the increase of the efficiency of internal combustion engines of the aforementioned type if heat is given off to the cooling water only to the extent, as is absolutely necessary as regards the heat resistance of the utilized materials. Different possibilities exist to reduce the heat transfer from the piston to the cylinder. On the one hand, there exists the possibility to utilize pistons of a high heat-resistant and poorly heat-conducting material. Additionally, it has also been already attempted to reduce the heat transfer by cylinder liners and cast-in parts in the cylinder head. The casting-in in the cylinder head, however, results in casting problems, especially with the use of ceramic materials and in connection with the solution of the problem to permit as little heat as possible to reach from the interior of the cylinder and from the cylinder itself to the cylinder head.

This problem of the heat damming or heat insulation is solved by the present invention in that a flat seal constructed as intermediate plate extends between the cylinder block and the cylinder head from the edge of the cylinder bore also up to the center thereof—leaving free exclusively circular openings for disk valves—and thus represents a thermal insulation of the combustion space with respect to the cylinder head. This intermediate plate, depending on the selected material and the size of the engine, could have a thickness of about 3 to about 8 mm. and thus would have a greater thickness than the heretofore customary cylinder head seal. This intermediate plate could additionally be coated on both sides with a relatively soft material which thus serves as replacement for the cylinder head seal. The possibility thereby exists to make the intermediate plate of a heat-insulating material of any suitable known type. The material with which the intermediate plate is coated, may be metallic.

By the use of these measures according to the present invention, the cylinder block and the cylinder head could be machined as customary heretofore. Subsequent thereto, only the intermediate plate according to the present invention would have to be installed between the cylinder block and the cylinder head in lieu of the usual cylinder head seal, as a result of which the heat transfer to the cylinder head is reduced.

As to the rest, with engines that do not rotate at very high speeds or with a corresponding selection for this intermediate plate, the intermediate plate can be used as valve seat, if according to a further feature of the present invention, the circular openings for the disk valves are just so large that they serve as guidance and/or seat for a respective valve head. This means therefore that the intermediate plate can not only serve as heat insulation but at the same time also as valve seat for the fixing and as valve guidance.

Additionally, the intermediate plate according to the present invention may be used for the distribution of the heat quantity and, as a result thereof, for the regulation of the heat transfer in that through-openings or passages of different size are provided in the intermediate plate in order to realize the distribution of the cooling water corresponding to the cross-sectional ratios in the openings or passages.

Accordingly, it is an object of the present invention to provide a seal for a cylinder head of an internal combustion engine which avoids by simple means the aforementioned shortcomings and drawbacks encountered in the prior art.

Another object of the present invention resides in an internal combustion engine of the type described above in which the engine efficiency is increased by reducing the transfer of heat from the piston and/or cylinder block to the cylinder head.

A further object of the present invention resides in a seal for a cylinder head of an internal combustion engine which is simple in construction, permits customary manufacturing methods for both the cylinder block and the cylinder head and achieves an effective heat damming in the direction toward the cylinder head.

Another object of the present invention resides in a seal for a cylinder head of a reciprocating piston internal combustion engine in which ceramic materials can be used, where necessary, and any new casting problems are effectively avoided.

Figure 2:
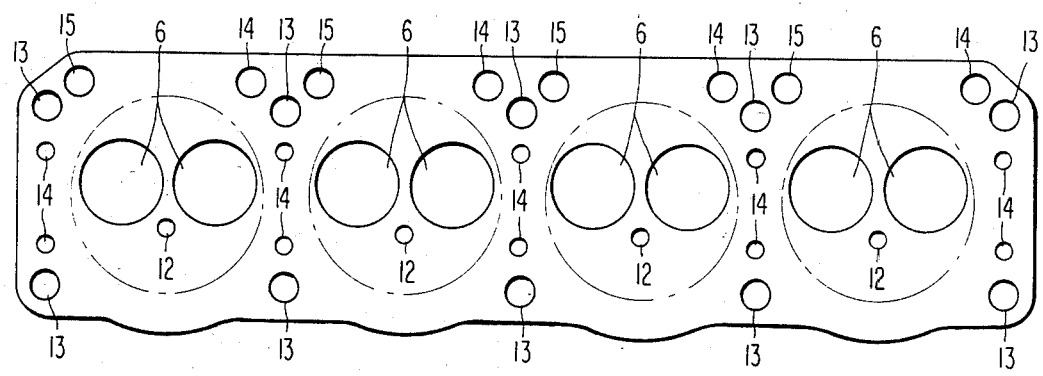

These and other objects, features and advantages of the present invention will become more apparent from the following description when taken in connection with the accompanying drawing which shows, for purposes of illustration only, one embodiment in accordance with the present invention, and wherein:

FIG. 1 is a partial cross-sectional view through a cylinder block and a cylinder head assembled thereon in accordance with the present invention; and FIG. 2 is a plan view on an intermediate plate which according to the present invention is placed between the cylinder head and the cylinder block and serves simultaneously as flat seal.

Referring now to the drawing wherein like reference numerals are used throughout the two views to designate like parts, reference numeral 1 designates the cylinder block of an otherwise conventional internal combustion engine provided with a cylinder bore or bores 2. An intermediate plate 4 according to the present invention which is disposed between the cylinder block 1 and the cylinder head 3 and which is constructed as flat seal, additionally extends from the edge of the cylinder bore 2 also up to its axis 5, and thus represents a thermal insulation of the combustion space with respect to the cylinder head. The intermediate plate 4 for the thermal insulation of the combustion space hereby serves at the same time as valve seat since the openings 6 for the disk valves 7 have been made precisely so large that they serve as guide and seat means for the valve heads 8. In order that the intermediate plate 4 can be installed or emplaced fitting accurately, fitting pins 9 are provided which assure the correct position of the intermediate plate 4.

The intermediate plate 4 which consists of a suitable heat-insulating material of any conventional type, is coated on both sides thereof with a relatively soft metallic material 10, 11 of any known type suitable therefor. The two layers 10 and 11 impart to the intermediate plate 4, in addition to the insulating quality, also the sealing properties which must be demanded of a sealing plate.

A plan view on the intermediate plate 4 is shown in FIG. 2. The contours of the intermediate plate 4, especially also the opening 6 for the valves, and the extension of the intermediate plate into the area of the cylinder bores 2 can be seen from this plan view, where exclusively the aforementioned opening 6 for the guidance and the seating of the valve heads are left free in the area over the cylinder bores 2. As to the rest, FIG. 2 also shows passages of different size, whereby the passages 12 may be provided for the injection nozzle or the spark plug, and the passages 13 provide space for the shanks of the cylinder head bolts, by means of which the cylinder head 3 is screwed onto the cylinder block 1, The passages 14 are provided for the passage or flow of water. They have different sizes so that, as a result thereof, the distribution of the cooling water can be controlled depending on the desired requirements. Finally, passages 15 are provided which permit flow of oil from the cylinder head to the cylinder block.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A sealing arrangement of the cylinder head with respect to the cylinder block of a reciprocating piston internal combustion engine by means of a flat seal means extending in the radial direction at least from the cylinder bore to the circumference of the cylinder collar, said flat seal means being provided with openings, characterized in that the flat seal means is constructed as intermediate plate which extends from the edge of a respective cylinder bore also to its axis while leaving free within the area of a respective cylinder bore essentially only circular openings for valve means, and thus represents a thermal insulation of the combustion space with respect to the cylinder head.

2. A sealing arrangement according to claim 1, characterized in that exclusively circular openings for disk valves are left in the intermediate plate within the area above each cylinder bore.

3. A sealing arrangement according to claim 1, characterized in that the intermediate plate consists of a heat-insulating material.

4. A sealing arrangement according to claim 1 or 3, characterized in that a further opening is provided in the intermediate plate above each cylinder bore to accommodate one of injection nozzle and spark plug.

5. A sealing arrangement according to claim 1 or 3, characterized in that the intermediate plate which has a thickness greater than the thickness of heretofore customary cylinder head sealing plates, is coated on both sides with a relatively soft material.

6. A sealing arrangement according to claim 5, characterized in that said coating material is metallic.

7. A sealing arrangement according to claim 5, characterized in that the circular openings are just so large that they serve as at least one of guide and seat means for a respective valve head.

8. A sealing arrangement according to claim 7, characterized in that passage means are provided in the intermediate plate which are of different size in order to realize a controlled distribution of cooling water corresponding to the mutual cross-sectional ratios of the passage means.

9. A sealing arrangement according to claim 8, characterized in that further passage means are provided in the intermediate plate for the flow therethrough of lubricating oil.

10. A sealing arrangement according to claim 9, characterized in that a further opening is provided in the intermediate plate above each cylinder bore to accommodate one of injection nozzle and spark plug.

11. A sealing arrangement according to claim 1, characterized in that the circular openings are just so large that they serve as at least one of guide and seat means for a respective valve head.

12. A sealing arrangement according to claim 1 or 11, characterized in that passage means are provided in the intermediate plate which are of different size in order to realize a controlled distribution of cooling water corresponding to the mutual cross-sectional ratios of the passage means.

13. A sealing arrangement according to claim 12, characterized in that further passage means are provided in the intermediate plate for the flow therethrough of lubricating oil.

14. A sealing arrangement according to claim 13, characterized in that a further opening is provided in the intermediate plate above each cylinder bore to accommodate one of injection nozzle and spark plug.

* * * * *